United States Patent
Tamura (10) Patent No.: US 10,244,197 B2
(45) Date of Patent: Mar. 26, 2019

(54) PROJECTOR AND CONTROL METHOD OF PROJECTOR

(71) Applicant: SEIKO EPSON CORPORATION, Tokyo (JP)

(72) Inventor: Akihiko Tamura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/904,761

(22) Filed: Feb. 26, 2018

(65) Prior Publication Data

US 2018/0255266 A1 Sep. 6, 2018

(30) Foreign Application Priority Data

Mar. 1, 2017 (JP) .................. 2017-038128

(51) Int. Cl.
| | | |
|---|---|---|
| *G06T 7/73* | (2017.01) | |
| *H04N 5/74* | (2006.01) | |
| *H04N 9/64* | (2006.01) | |
| *G03B 21/14* | (2006.01) | |

(52) U.S. Cl.
CPC ......... *H04N 5/7416* (2013.01); *G03B 21/142* (2013.01); *G06T 7/74* (2017.01); *H04N 9/64* (2013.01)

(58) Field of Classification Search
CPC .......... H04N 5/7416; H04N 9/64; G06T 7/74; G03B 21/142
See application file for complete search history.

(56) References Cited

U.S. PATENT DOCUMENTS

2001/0030668 A1* 10/2001 Erten .................... G06F 3/0304
 715/863
2015/0208050 A1 7/2015 Pawlak et al.

FOREIGN PATENT DOCUMENTS

JP 2015-159524 A 9/2015

* cited by examiner

*Primary Examiner* — Michael E Teitelbaum
(74) *Attorney, Agent, or Firm* — Oliff PLC (57) ABSTRACT

A projector includes a projection unit that projects a projection image and a control unit that performs calibration. The control unit detects a position of a first detection point in a first symbol, from a first captured image obtained by capturing a first projection image when the projection unit projects the first projection image including the first symbol onto a projection surface, detects a position of a second detection point in a second symbol, based on the position of the first detection point, from a second captured image obtained by capturing a second projection image when the projection unit projects the second projection image including the second symbol onto the projection surface, and performs the calibration based on the position of the second detection point. The second symbol is disposed at a position corresponding to the first symbol and has a shape different from the first symbol.

16 Claims, 8 Drawing Sheets

FIG.13

PROJECTOR AND CONTROL METHOD OF PROJECTOR

BACKGROUND

1. Technical Field

The present invention relates to a projector and a control method of the projector.

2. Related Art

A projector (interactive projector) which allows control of a projection image by using a pointing object (for example, electronic pen or finger) for pointing a projection surface on which the projection image is projected is known. In such a projector, calibration of performing position association between the projection image and a captured image obtained by capturing the projection image on the projection surface is performed.

JP-A-2015-159524 discloses a projector that detects a specific position (specific point) in a predetermined pattern from a captured image obtained by an image capturing unit of the projector capturing a projection image of a predetermined pattern, and performs calibration based on the detection result.

The predetermined pattern shown in the captured image may be deformed in accordance with a projection condition (for example, inclination of the projector from the projection surface or a distance between the projection surface and the projector) and the like. Therefore, a pattern suitable for calibration varies depending on the projection condition and the like. Thus, in a method of detecting a specific position based on only single pattern, detection accuracy of the specific position may vary depending on a change of the projection condition and the like, and accuracy in calibration may vary.

SUMMARY

An advantage of some aspects of the invention is to provide a technology of allowing suppression of variation of accuracy in calibration.

An aspect of a projector according to the invention includes a projection unit and a control unit. The projection unit projects a projection image onto a projection surface. The control unit performs calibration of performing position association between the projection image and a captured image, based on the captured image obtained by capturing the projection image. The control unit detects a position of a first detection point in a first symbol, from a first captured image obtained by capturing a first projection image when the projection unit projects the first projection image including the first symbol onto the projection surface, detects a position of a second detection point in a second symbol, based on the position of the first detection point, from a second captured image obtained by capturing a second projection image when the projection unit projects the second projection image including the second symbol onto the projection surface, and performs the calibration based on the position of the second detection point. The second symbol is disposed at a position corresponding to the first symbol and has a shape different from the first symbol.

According to the aspect of the projector according to the invention, the position of the second detection point in the second symbol is detected based on the position of the first detection point in the first symbol, and the calibration is performed based on the position of the second detection point. Therefore, it is possible to improve detection accuracy of the position of a detection point and to suppress variation of accuracy in calibration, which occurs by a projection condition and the like, in comparison with a case where the position of the detection point is detected based on only a single pattern (for example, only a second projection image).

In the aspect of the projector, it is preferable that the relative position of the first detection point to the first projection image corresponds to the relative position of the second detection point to the second projection image. According to the aspect with this configuration, since the relative positions of the first detection point and the second detection point correspond to each other, it is possible to easily detect the second detection point after the first detection point is detected.

In the aspect of the projector, it is preferable that the first symbol is a figure having a corner. The shape of noise which is shown in the captured image and is caused by external light such as light of the sun or light of a ceiling lamp is a circle or an elliptical shape in many cases. In the aspect with this configuration, the first symbol is a figure having a corner. That is, the first symbol has a shape which is different from the shape of noise caused by the external light. Therefore, it can be difficult to erroneously detect noise caused by external light, as the first symbol.

In the aspect of the projector, it is preferable that the first symbol is a figure having a plurality of corners. According to the aspect with this configuration, since the first symbol is a figure having a plurality of corners, it can be more difficult to erroneously detect noise caused by external light, as the first symbol.

In the aspect of the projector, it is preferable that the second symbol is a figure formed by a closed line and the second detection point is a centroid of the figure formed by the closed line.

The symbol shown in the captured image may be distorted by the projection condition (for example, inclination of the projector to the projection surface) and the like. An influence of the distortion on the centroid of the figure is smaller than an influence of the distortion on the contour of the figure. According to the aspect with this configuration, the second detection point is the centroid of a figure formed by a closed line. Therefore, detection accuracy of a position is improved in comparison with a case where a portion of the contour of a figure is detected. Thus, it is possible to perform calibration with high accuracy by performing the calibration based on the detection result of the position of the second detection point.

In the aspect of the projector, it is preferable that the second symbol is a circle or an ellipse.

In a case of a circle or an ellipse, a shift of the position of the centroid hardly occurs even though distortion occurs by the projection condition and the like. Therefore, according to the aspect with this configuration, it is possible to perform calibration with high accuracy.

In the aspect of the projector, it is preferable that the control unit determines a detection area in the second captured image, based on the detected position of the first detection point, and detects a position of the second detection point in the second symbol included in the detection area. According to the aspect with this configuration, since the position of the second detection point in the second symbol included in the determined detection area is detected, it is possible to suppress an occurrence of a situation in which noise caused by external light is erroneously detected as the second symbol.

In the aspect of the projector, it is preferable that the color of the first symbol is different from the color of the second symbol, and the projection unit projects the first projection image and the second projection image together onto the projection surface. According to the aspect with this configuration, since the first symbol and the second symbol are projected together with different colors, it is possible to reduce the number of times of projection.

An aspect of a control method of a projector according to the invention is a control method of a projector that projects a projection image onto a projection surface, and performs calibration of performing position association between the projection image and a captured image, based on the captured image obtained by capturing the projection image. The control method includes detecting a position of a first detection point in a first symbol, from a first captured image obtained by capturing a first projection image when the first projection image including a first symbol is projected onto the projection surface, detecting a position of a second detection point in a second symbol, based on the position of the first detection point, from a second captured image obtained by capturing a second projection image when the second projection image including the second symbol is projected onto the projection surface, the second symbol being disposed at a position corresponding to the first symbol and having a shape different from the first symbol, and performing the calibration based on the position of the second detection point.

According to the aspect, it is possible to suppress variation of accuracy in calibration, which occurs by the projection condition and the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an exemplary embodiment of the invention will be described with reference to the drawings. Dimensions and the scale of components in the drawings may be appropriately different from practical dimensions and the practical scale thereof. An exemplary embodiment which will be described below is the preferred specific example of the invention. Therefore, in the exemplary embodiment, various limitations which are technically preferable are applied. However, the range of the invention is not limited to the exemplary embodiment so long as descriptions that the invention is particularly limited are not made in the following descriptions.

Exemplary Embodiment

Figure 1:
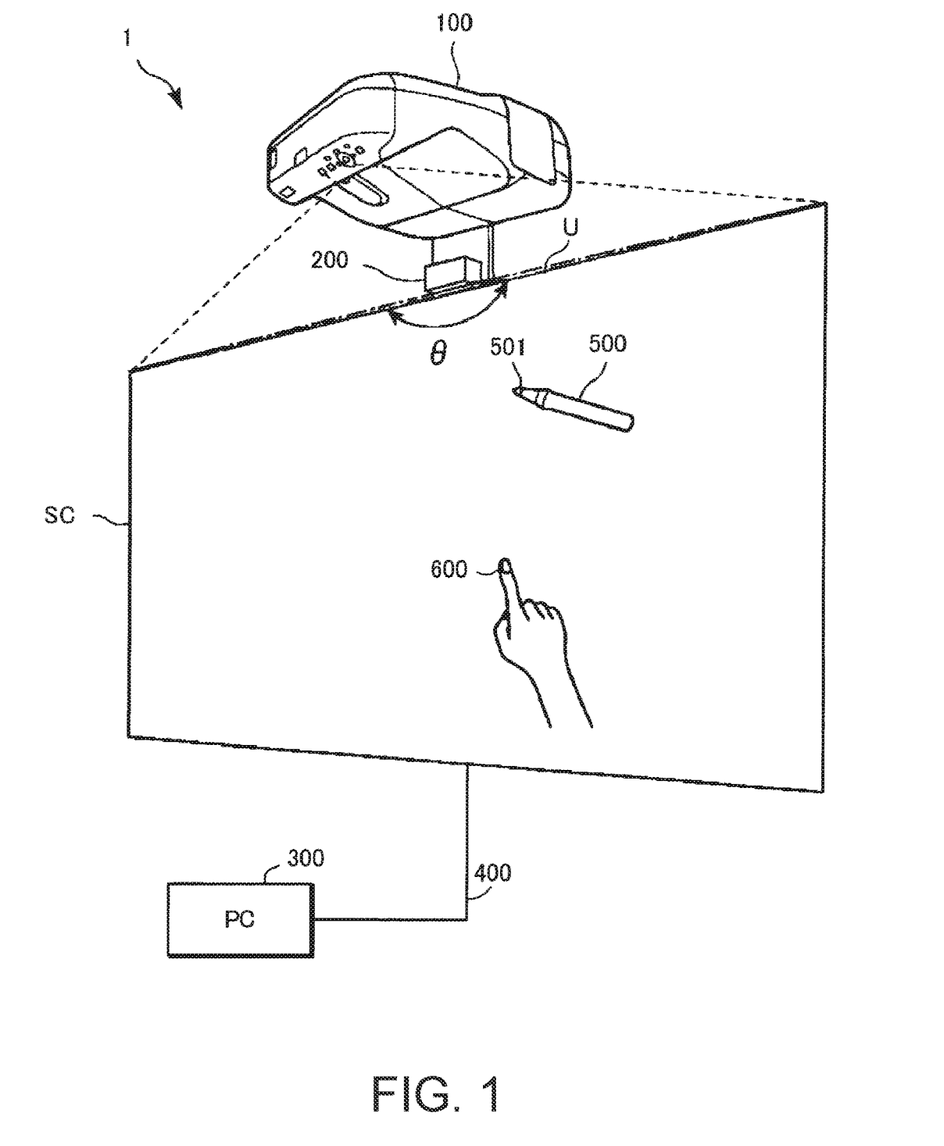
FIG. 1 is a schematic diagram illustrating a projection system according to an exemplary embodiment.

FIG. 1 is a schematic diagram illustrating a projection system 1 according to the exemplary embodiment to which the invention is applied. The projection system 1 includes a projector 100 and a light emitting device 200.

The projector 100 is disposed over an upper end U of a screen SC. The projector 100 receives image information from a personal computer (PC) 300 through a communication line 400, and projects and displays an image corresponding to the received image information, on the screen SC. The projector 100 may read image information stored in a storage unit 104 (see FIG. 2), and display an image corresponding to the read image information, on the screen SC. An image projected onto the screen SC is also referred to as "a projection image" below. The screen SC is an example of the projection surface. The projection surface is not limited to the screen SC and may be appropriately changed. For example, a wall may be used as the projection surface.

The light emitting device 200 is installed over the upper end U of the screen SC, and emits light (for example, light in a region out of a visible region) downward in a range of an angle of θ. In the exemplary embodiment, the light emitting device 200 emits infrared light. The light emitted by the light emitting device 200 forms a light layer along the screen SC. The light emitted by the light emitting device 200 is used when the projector 100 detects the position of the finger 600 of the hand of a user who points the screen SC.

The projector 100 captures an image of the screen SC by using an image capturing unit 103 (see FIG. 2), so as to generate a captured image indicating a position at which the finger 600 reflects light from the light emitting device 200, and to detect the position of the finger 600 based on the captured image.

The projector 100 captures an image of the screen SC by using the image capturing unit 103, so as to generate a captured image indicating an electronic pen 500 in which infrared light is emitted from a tip end 501, and to detect the position of the electronic pen 500 based on a position (shown in the captured image) at which the infrared light is emitted (tip end 501).

The electronic pen 500 and the finger 600 are an example of a pointing object.

The projector 100 performs calibration (also simply referred to as "calibration" below) of associating positions with each other between the captured image and the projection image. Details of the calibration will be described later. The projector 100 specifies the position of a projection image (screen SC) pointed by the electronic pen 500 or specifies the position of a projection image (screen SC) pointed by the finger 600, by using a calibration result and the captured image.

Figure 2:
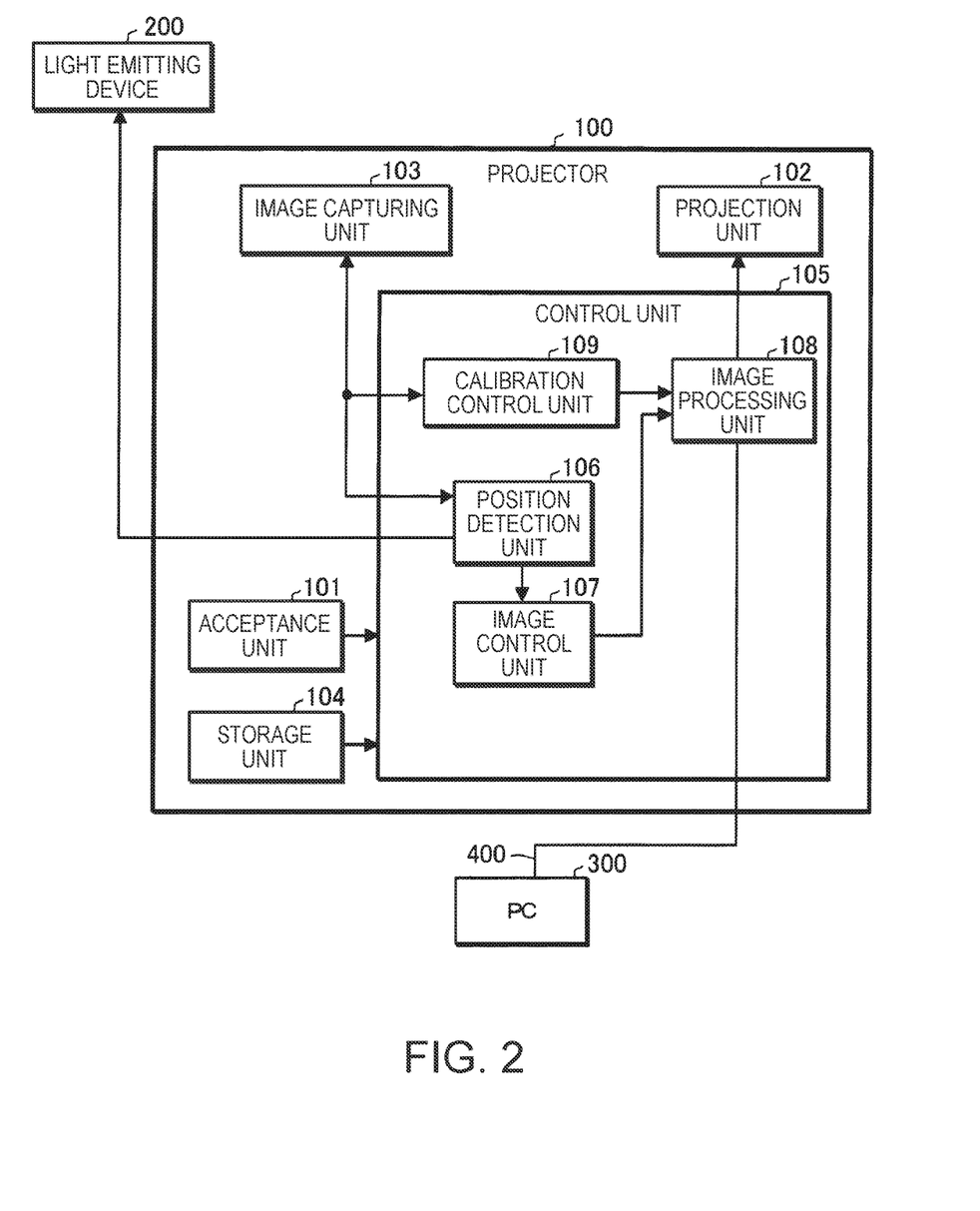
FIG. 2 is a diagram illustrating a configuration example of a projector.

FIG. 2 is a diagram illustrating a configuration example of the projector 100. The projector 100 includes an acceptance unit 101, a projection unit 102, the image capturing unit 103, the storage unit 104, and a control unit 105.

The acceptance unit 101 corresponds to various operation buttons or a touch panel for accepting an input operation (for example, a power ON operation and a calibration start operation) of a user. The acceptance unit 101 may be a remote controller and the like configured to transmit information corresponding to an input operation which is received from a user, in a wireless or wired manner. In this case, the projector 100 includes a reception unit that receives information transmitted by the remote controller. The remote controller includes various operation buttons, various operation keys, or a touch panel for accepting an input operation of a user.

The projection unit 102 projects an image corresponding to an image signal output by the control unit 105, onto the screen SC. For example, the image signal is generated in a manner that the control unit 105 processes image information output from the PC 300 or in a manner that the control unit 105 processes image information read from the storage unit 104. The image signal means information corresponding to image information.

Figure 3:
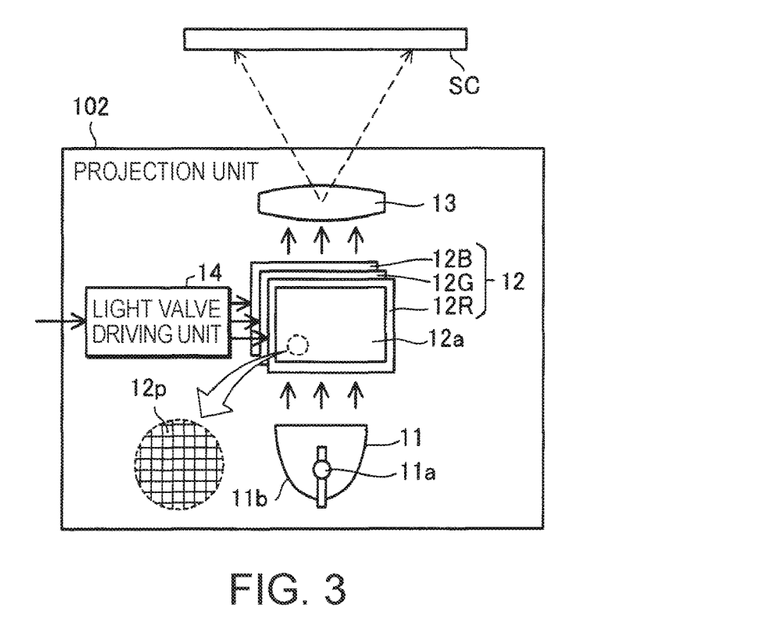
FIG. 3 is a diagram illustrating an example of a projection unit.

FIG. 3 is a diagram illustrating an example of the projection unit 102. The projection unit 102 includes a light source 11, three liquid crystal light valves 12 (12R, 12G, 12B) which are an example of a light modulation device, a projection lens 13 which is an example of a projection optical system, a light valve driving unit 14, and the like. In the projection unit 102, the liquid crystal light valve 12 modulates light emitted from the light source 11 and a projection image (image light) is formed. The projection unit 102 enlarges and projects the projection image through the projection lens 13.

The light source 11 includes a light source unit 11a and a reflector 11b. The light source unit 11a is configured by a xenon lamp, an ultra-high mercury lamp, a light emitting diode (LED), or a laser light source. The reflector 11b reduces variation of a direction of light emitted by the light source unit 11a. Variation of brightness distribution of light emitted from the light source 11 is reduced by an integrator optical system (not illustrated). Then, the light is separated into color light components of red (R), green (G), and blue (B) which are three primary colors of light, by a color separation optical system (not illustrated). The color light components of R, G, and B are incident to the liquid crystal light valves 12R, 12G, and 12B, respectively.

The liquid crystal light valve 12 is configured by a liquid crystal panel and the like in which liquid crystal is sealed between a pair of transparent substrates. A rectangular pixel area 12a including a plurality of pixels 12p which are arranged in a matrix is formed in the liquid crystal light valve 12. The liquid crystal light valve 12 can apply a driving voltage to the liquid crystal for each of the pixels 12p. If the light valve driving unit 14 applies a driving voltage depending on an image signal input from the control unit 105, to the pixels 12p, each of the pixels 12p is set to have light transmittance in accordance with the image signal. Therefore, light emitted from the light source 11 is modulated by passing through the pixel area 12a, and thus an image corresponding to the image signal is formed for each type of color light.

Image of colors are synthesized for each pixel 12p by a color synthesis optical system, and thus a projection image which is a color image (color image light) is generated. The projection image is enlarged and projected onto the screen SC by the projection lens 13.

Returning to FIG. 2, the image capturing unit 103 generates a captured image by capturing an image of the screen SC.

Figure 4:
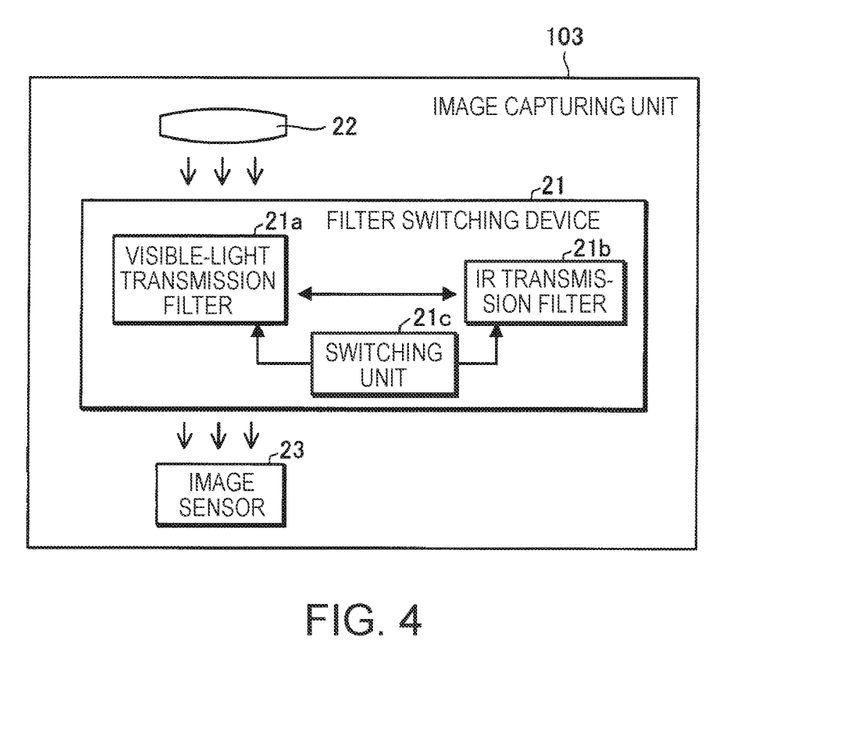
FIG. 4 is a diagram illustrating an example of an image capturing unit.

FIG. 4 is a diagram illustrating an example of the image capturing unit 103. The image capturing unit 103 includes a filter switching device 21, an optical system 22 such as a lens, an image sensor 23, and the like.

The filter switching device 21 includes a visible-light transmission filter 21a, an infrared-light (IR) transmission filter 21b, and a switching unit 21c. The visible-light transmission filter 21a transmits visible light and cuts infrared light off. The IR transmission filter 21b transmits infrared light and cuts visible light off. The switching unit 21c causes one of the visible-light transmission filter 21a and the IR transmission filter 21b to be selectively disposed between the optical system 22 and the image sensor 23. The switching unit 21c causes the visible-light transmission filter 21a to be disposed between the optical system 22 and the image sensor 23 during calibration, and causes the IR transmission filter 21b to be disposed between the optical system 22 and the image sensor 23 when a pointed position of the pointing object (electronic pen 500 or finger 600) is detected.

The optical system 22 condenses light from the screen SC. As the image sensor 23, for example, a charge coupled device (CCD) image sensor or a complementary metal oxide semiconductor (CMOS) image sensor is provided. The image sensor 23 receives light condensed by the optical system 22, through the visible-light transmission filter 21a or the IR transmission filter 21b, and thus generates a captured image. In a case where cutting infrared light off is not required when calibration is performed, the visible-light transmission filter 21a may be omitted. In this case, the switching unit 21c performs switching between a state where the IR transmission filter 21b is disposed between the optical system 22 and the image sensor 23, and a state where the IR transmission filter 21b is not disposed between the optical system 22 and the image sensor 23.

Returning to FIG. 2, the storage unit 104 is a computer-readable recording medium. The storage unit 104 stores a program for defining an operation of the projector 100 and various types of information (for example, image information). In the exemplary embodiment, the storage unit 104 stores first image information indicating a first image and second image information indicating a second image. The first image information and the second image information are used in calibration.

Figure 5:
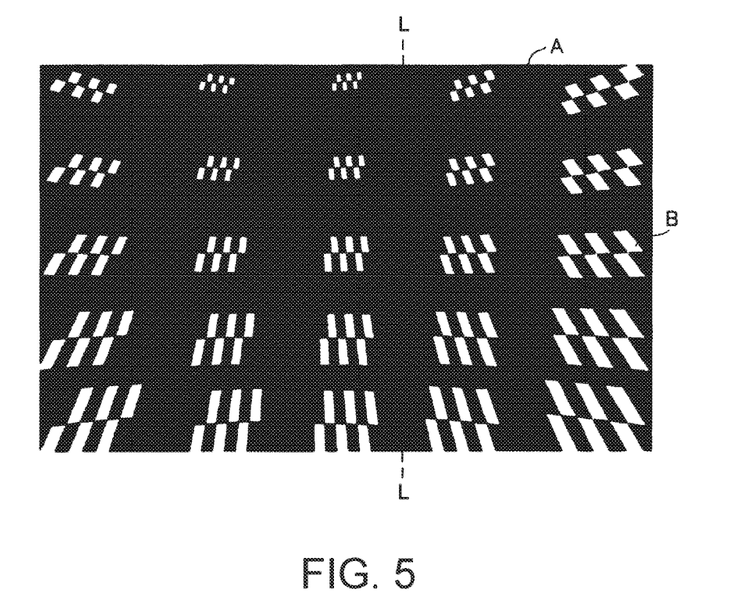
FIG. 5 is a diagram illustrating an example of a first projection image.

FIG. 5 is a diagram illustrating an example of a first projection image A which is projected onto the screen SC in accordance with a first image signal corresponding to the first image information, by the projection unit 102. The first projection image A is an image obtained in a manner that deformation such as enlargement, reduction, or distortion occurs in the first image in accordance with the projection condition and the like.

Symbols B of 5 rows×5 columns are arranged in the first projection image A. A symbol B is an example of a first symbol. The symbol B is a check pattern in which 6 white quadrangles are disposed on a black background. The symbol B is an example of a figure having a corner, that is, a figure having a plurality of corners.

Figure 6:
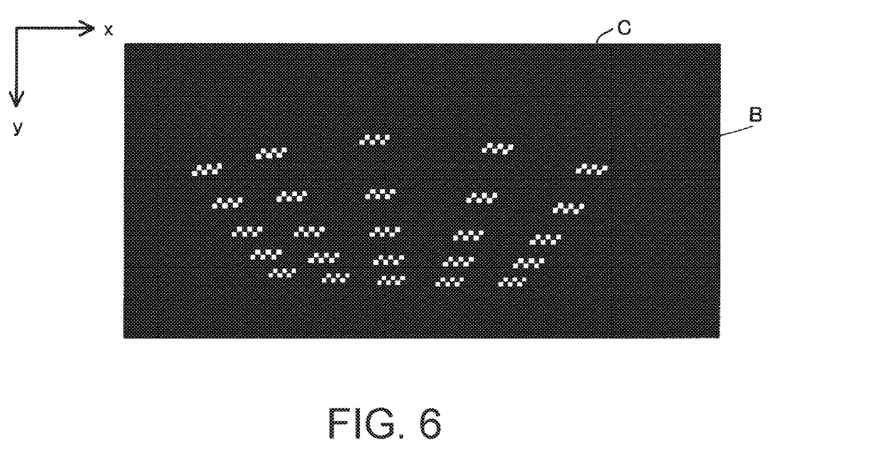
FIG. 6 is a diagram illustrating an example of a first captured image.

FIG. 6 is a diagram illustrating an example of a first captured image C generated in a manner that the image capturing unit 103 captures the first projection image A displayed on the screen SC. The symbol B is also shown in the first captured image C.

The shape and the position of the symbol B shown in the first captured image C (see FIG. 6) are different from the shape and the position of the symbol B shown in the first projection image A (see FIG. 5). This difference occurs by distortion or the like which is caused by an angle of the image capturing unit 103 to the screen SC and the optical system 22 of the image capturing unit 103.

Figure 7:
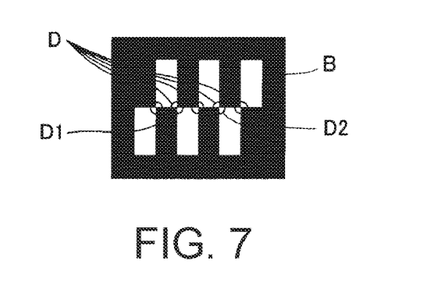
FIG. 7 is a diagram illustrating an example of a cross-point.

As illustrated in FIG. 7, the symbol B has 5 cross-points (intersection positions) D obtained by a white boundary line and a black boundary line crossing (intersecting with each other).

The 5 cross-points D are arranged in a line along a transverse direction in the first captured image C. The cross-point D is a vertex at the corner of a white rectangle constituting the symbol B, that is, a point at which vertices of the corners are in contact with each other. The cross-point D is an example of a first detection point.

The cross-point D is detected from the first captured image C. The shape of noise which is caused by external light and is shown in the first captured image C is a circle or an elliptical shape in many cases. The cross-point D is a vertex of the corner. That is, the shape of the corner which includes the cross-point D is different from the shape of the noise caused by external light. Therefore, it is difficult to erroneously detect the noise caused by the external light, as the symbol B including the cross-point D.

As a method of detecting the cross-point D, a method (for example, corner detection method of Harris) of detecting a corner of a white rectangle constituting the symbol B is used. Therefore, a line indicating the contour of the symbol B shown in the first captured image C is preferably parallel to a horizontal direction x or a vertical direction y of the first captured image C. Thus, the first image information is preset such that the line indicating the contour of the symbol B shown in the first captured image C is parallel to the horizontal direction x or the vertical direction y of the first captured image C under a predetermined condition.

However, deformation such as distortion may occur in the symbol B in the first captured image C, by the projection condition and processing (for example, processing of correcting trapezoidal distortion or electronic telewide processing of changing the size of an image) of image information in the control unit 105. In this case, the line indicating the contour of the symbol B in the first captured image C is not parallel to the horizontal direction x or the vertical direction y of the first captured image C, and detection accuracy of the cross-point D is decreased.

Thus, in the exemplary embodiment, a calibration image (image corresponding to the second image information) having a circle pattern is used together. The circle pattern has a difficulty in being influenced by the change of the projection condition and the processing of image information in the control unit 105.

Figure 8:
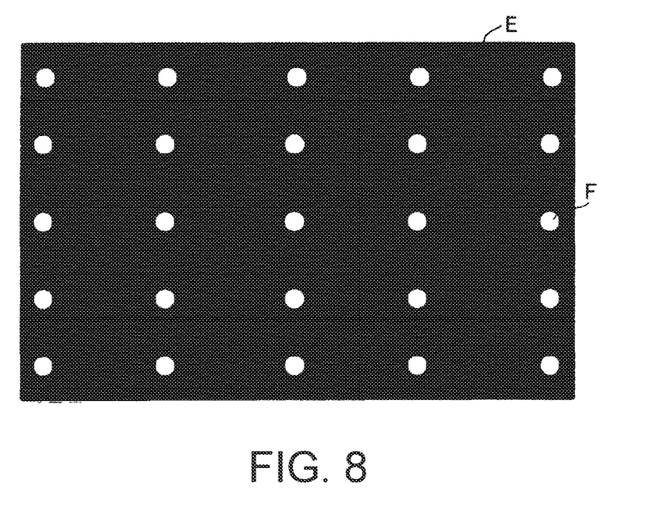
FIG. 8 is a diagram illustrating an example of a second projection image.

FIG. 8 is a diagram illustrating an example of a second projection image E projected onto the screen SC in accordance with a second image signal corresponding to the second image information, by the projection unit 102. The second projection image E is an image obtained in a manner that deformation such as distortion occurs in the second image in accordance with the projection condition and the like. The second projection image E is an example of a projection image for calibration.

Symbols F of 5 rows×5 columns are arranged in the second projection image E. The symbol F is an example of a second symbol. The 25 symbols F correspond to the 25 symbols B (see FIGS. 5 and 6) one by one. The symbol F is disposed at a position corresponding to the position of the corresponding symbol B. The symbol F is a circle displayed with a white color on a black background. The shape of the symbol F is different from that of the symbol B. The symbol F is an example of a figure formed by a closed line.

The relative position of the centroid of the symbol F to the second projection image E corresponds (in the exemplary embodiment, coincides with) to the relative position of one cross-point D among 5 cross-points D of the corresponding symbol B, to the first projection image A. Therefore, it can be stated that this only one cross-point D means an example of the first detection point.

Figure 9:
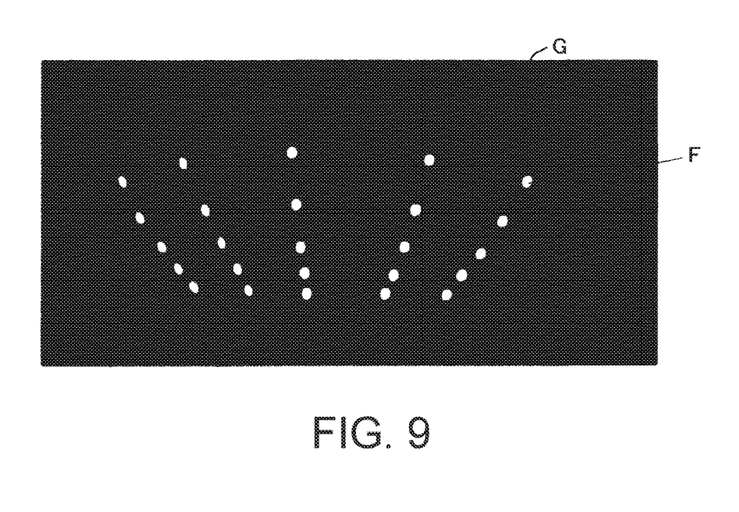
FIG. 9 is a diagram illustrating an example of a second captured image.

FIG. 9 is a diagram illustrating an example of a second captured image G generated in a manner that the image capturing unit 103 captures the second projection image E displayed on the screen SC. The symbol F is also shown in the second captured image G.

The shape and the position of the symbol F shown in the second captured image G (see FIG. 9) are different from the shape and the position of the symbol F shown in the second projection image E (see FIG. 8). This difference occurs by distortion which is caused by an angle of the image capturing unit 103 to the screen SC and the optical system 22 of the image capturing unit 103. The centroid of the symbol F is an example of a second detection point.

In the exemplary embodiment, regarding 15 symbols B which are positioned on the left side of a vertical line L among the 25 symbols B shown in the first projection image A in FIG. 5, the relative position of the second cross-point D1 (see FIG. 7) from the left among the 5 cross-points D to the first projection image A coincides with the relative position of the centroid of the corresponding symbol F to the second projection image E.

Regarding 10 symbols B which are positioned on the right side of the vertical line L among the 25 symbols B shown in the first projection image A in FIG. 5, the relative position of the second cross-point D2 (see FIG. 7) among the 5 cross-points D to the first projection image A coincides with the relative position of the centroid of the corresponding symbol F to the second projection image E.

Returning to FIG. 2, the control unit 105 is a computer such as a central processing unit (CPU). The control unit 105 reads and executes the program stored in the storage unit 104, so as to realize a position detection unit 106, an image control unit 107, an image processing unit 108, and a calibration control unit 109.

The position detection unit 106 causes the light emitting device 200 to emit infrared light. The position detection unit 106 detects the pointed position of the electronic pen 500 and the pointed position of the finger 600 based on a calibration result and a captured image generated by the image capturing unit 103 with infrared light.

The image control unit 107 controls an image to be projected, based on the pointed position of the electronic pen 500 or the finger 600. For example, the image control unit 107 draws a figure or disposes a character or a mark, at the pointed position on the projection image by the electronic pen 500 or the finger 600. Alternatively, the image control unit 107 may draw a figure along a trajectory of the pointed position.

The image processing unit 108 processes image information received from, for example, the PC 300, and thus generates an image signal. For example, the image processing unit 108 generates a superimposition image in which an image drawn by the image control unit 107 is superimposed on an image indicated by the image information received from the PC 300. The image processing unit 108 generates an image signal indicating the generated superimposition image. The image processing unit 108 outputs the generated image signal to the projection unit 102 and causes the projection unit 102 to project a projection image corresponding to the image signal.

The calibration control unit 109 performs calibration of performing position association between the captured image and the projection image. The calibration control unit 109 causes the projection unit 102 to project the first projection image A (see FIG. 5) and the second projection image E (see FIG. 8) onto the screen SC. The calibration control unit 109 performs calibration based on the first captured image C (see FIG. 6) obtained by the image capturing unit 103 capturing the first projection image A, and the second captured image G obtained by the image capturing unit 103 capturing the second projection image E.

Figure 10:
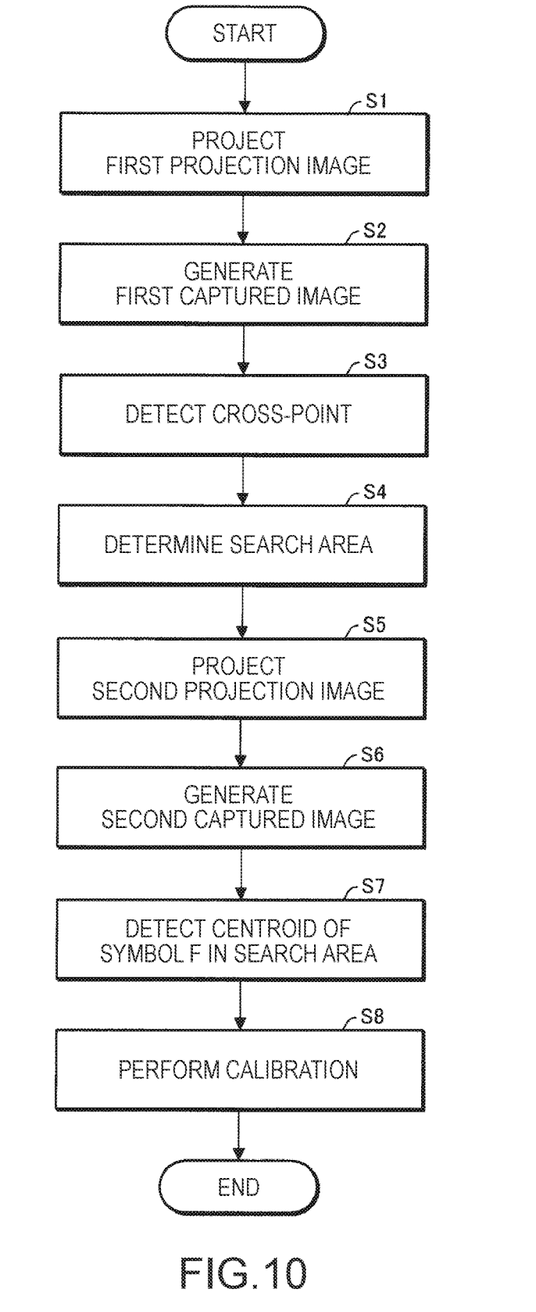
FIG. 10 is a flowchart illustrating a calibration operation.

Next, an operation will be described. FIG. 10 is a flowchart illustrating a calibration operation. The operation illustrated in FIG. 10 is started if the acceptance unit 101 receives a power ON operation or a calibration start operation.

The calibration control unit 109 reads first image information from the storage unit 104 and outputs the first image information to the image processing unit 108. The image processing unit 108 generates a first image signal corresponding to the first image information and outputs the first image signal to the projection unit 102. The projection unit 102 projects a first projection image A (see FIG. 5) corresponding to the first image signal, onto the screen SC (Step S1).

The calibration control unit 109 controls the switching unit 21c so as to cause the visible-light transmission filter 21a to be disposed between the optical system 22 and the image sensor 23. The calibration control unit 109 operates the image sensor 23. If the image sensor 23 starts an operation, the image capturing unit 103 generates a first captured image C (see FIG. 6) by capturing an image of the screen SC on which the first projection image A is displayed (Step S2).

The calibration control unit 109 detects a cross-point D from the first captured image C, for example, by using the corner detection method of Harris (Step S3). The shape of the cross-point D is different from the shape (circle or ellipse) of noise caused by external light. Thus, it is possible to reduce a probability of erroneously detect noise caused by external light when the cross-point D is detected.

Figure 11:
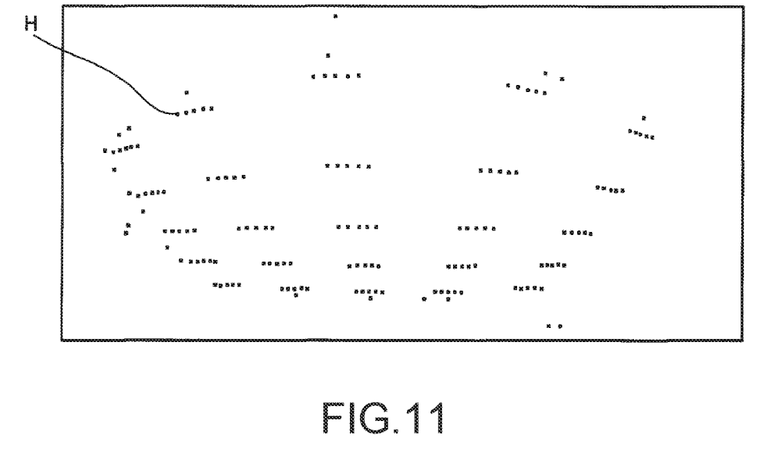
FIG. 11 is a diagram illustrating an example of a detection result of the cross-point.

FIG. 11 is a diagram illustrating an example of a detection result of the cross-point D. In FIG. 11, a point detected as the cross-point D is indicated by a point H. As illustrated in FIG. 11, the calibration control unit 109 may detect points of which the number is greater than the number of cross-points D, as the cross-point D by an influence of the noise. In such a case, the calibration control unit 109 specifies only 5 points H which are arranged in an area having a specific size, as the detection point of the cross-point D in the first captured image C. Thus, it is possible to suppress the noise.

The calibration control unit 109 determines a search area used when the centroid of a symbol F (see FIG. 9) is detected, by using the detection result of the cross-point D (Step S4). Since the search area is determined by using the detection result of the cross-point D, a probability of the centroid of the symbol F being provided in the search area is high. The search area is an example of a detection area.

Figure 12:
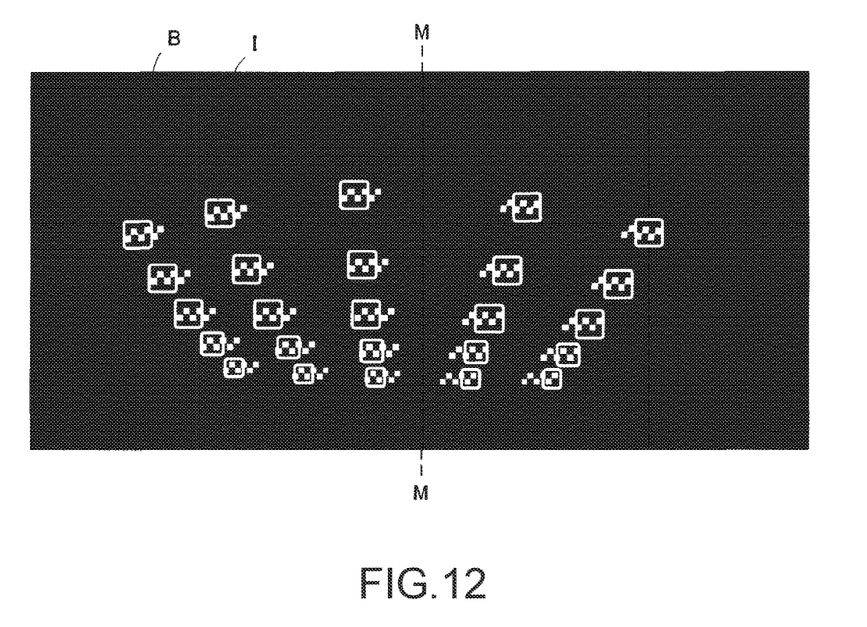
FIG. 12 is a diagram illustrating an example of a search area.

FIG. 12 is a diagram illustrating an example of the search area I.

In the example illustrated in FIG. 12, regarding 15 symbols B which are positioned on the left side of a vertical line M among the 25 symbols B, the search area I is set by using the second cross-point D from the left among 5 cross-points D, as the center. Regarding 10 symbols B which are positioned on the right side of the vertical line M, the search area I is set by using the second cross-point D from the right among 5 cross-points D, as the center. In FIG. 12, the 25 symbols B are illustrated in order to describe a relative positional relationship with the search area I. Practically, the symbol B is not provided in the captured image in which the search area I is set.

The calibration control unit 109 determines search areas I so as not to overlap another search area I. The size of the search area I is larger than the symbol F.

The calibration control unit 109 reads second image information from the storage unit 104 and outputs the second image information to the image processing unit 108. The image processing unit 108 generates a second image signal corresponding to the second image information, and outputs the second image signal to the projection unit 102. The projection unit 102 projects a second projection image E (see FIG. 8) corresponding to the second image signal, onto the screen SC (Step S5).

The calibration control unit 109 controls the image capturing unit 103 to generate a second captured image G (see FIG. 9) by capturing an image of the screen SC on which the second projection image E is displayed (Step S6).

The calibration control unit 109 sets a search area I in the second captured image G, and detects the position of the centroid of the symbol F included in the search area I in the second captured image G (Step S7).

Figure 13:
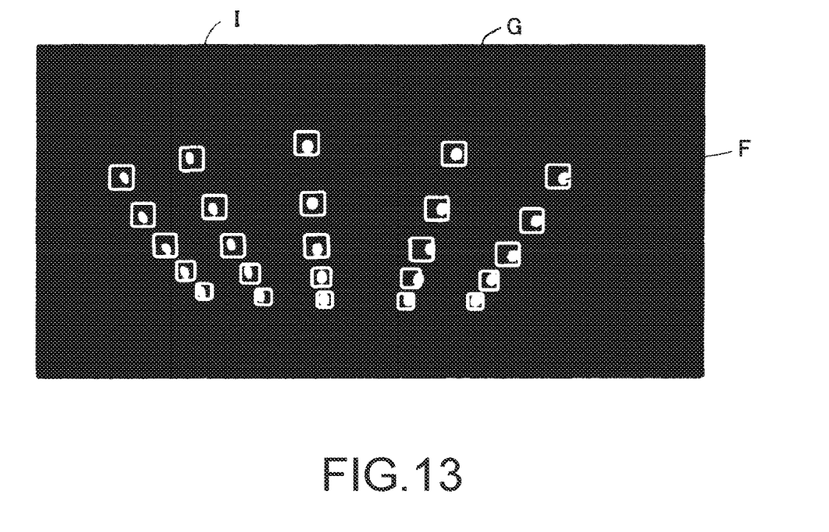
FIG. 13 is a diagram illustrating the search area set in a second captured image.

FIG. 13 is a diagram illustrating the search area I set in the second captured image G. The original shape of the symbol F is a circle. Thus, the symbol F may be distorted to an ellipse in the second captured image G, but the centroid of the symbol F is not largely shifted. Therefore, it is possible to detect the position with accuracy higher than that when the position of the cross-point D is detected. The shape of the symbol F in the second captured image G is a circle or an ellipse, and is similar to the shape of noise caused by external light. However, since the calibration control unit 109 performs detection in a range of the search area I set in the second captured image G, it is possible to suppress an occurrence of a situation in which the noise of external light is erroneously detected as the symbol F.

The calibration control unit 109 performs calibration based on the detection result of the position of the centroid of the symbol F (Step S8). In Step S8, the calibration control unit 109 generates calibration data in which the position of the centroid of the symbol F in the second captured image G is associated with the position of the centroid of the symbol F in the second projection image E (position of the centroid of the symbol F, which is indicated by the second image information), for each symbol F. The calibration control unit 109 stores the calibration data in the storage unit 104. The position of the centroid of the symbol F, which is indicated by the second image information is stored in advance, in the storage unit 104 along with the second image information.

If the calibration is ended, the calibration control unit 109 controls the switching unit 21c, so as to cause the IR transmission filter 21b to be disposed between the optical system 22 and the image sensor 23. After that, the position detection unit 106 causes the light emitting device 200 to emit infrared light. The position detection unit 106 detects a pointed position by the electronic pen 500 or the finger 600, from a captured image generated in a manner that the image capturing unit 103 captures an image of the infrared light. The position detection unit 106 converts the detected pointed position into the position on a projection image corresponding to image information, based on the calibration data stored in the storage unit 104. Then, the position detection unit 106 outputs the converted position to the image control unit 107.

According to the projector 100 and the control method of the projector 100 in the exemplary embodiment, the search area I is set based on a result obtained by detecting the position of the cross-point D which has difficulty in being influenced by noise of external light, and thus the position of the centroid of the symbol F provided in the search area I is detected. Therefore, it is difficult to erroneously detect the noise of external light as the symbol F, and it is possible to perform calibration with high accuracy.

MODIFICATION EXAMPLES

The invention is not limited to the above-described exemplary embodiment. For example, various modifications as follows can be made. One or a plurality of modifications which are randomly selected from the modifications which will be described next can be appropriately combined.

Modification Example 1

The shape of the symbol B is not limited to a check pattern, and may be a figure having a corner. The number of white rectangles constituting the check pattern which is the symbol B is not limited to 6, and may be appropriately changed.

Modification Example 2

The symbol F is not limited to a circle, and may be a figure formed by a closed line. In a case where the symbol F is a circle or an ellipse, shifting of the position of the centroid by distortion caused by the projection condition and the like hardly occurs. Thus, it is possible to detect the position of the centroid with high accuracy.

Modification Example 3

The relative position of a predetermined cross-point D1 to the first projection image A may not coincide with the relative position of the centroid of the corresponding symbol F to the second projection image E. For example, the relative position of the predetermined cross-point D1 to the first projection image A may be disposed to be shifted from the relative position of the centroid of the corresponding symbol F to the second projection image E, in a predetermined direction by a predetermined distance.

Modification Example 4

The color of the symbol B may be set to be different from the color of the symbol F (for example, the symbol B is blue and the symbol F is red). The projection unit 102 may project a synthesis image obtained by superimposing the first projection image A and the second projection image E, onto the screen SC. In this case, it is assumed that the projection unit 102 projects the first projection image A and the second projection image E together, onto the screen SC. At this time, the image capturing unit 103 captures only the color of the symbol B and generates the first captured image C. The image capturing unit 103 captures only the color of the symbol F and generates the second captured image G. In a case where the symbol B and the symbol F overlap each other, and thus detection of each of the symbols is difficult, as described in Modification Example 3, the symbols may be disposed to be shifted in predetermined directions by predetermined distances, respectively.

Modification Example 5

The number of symbols B and the number of symbols F are not limited to 25, and may be equal to or greater than 1.

Modification Example 6

In a case where detection of the finger 600 is not required, the light emitting device 200 may be omitted.

Modification Example 7

In the projection unit 102, the liquid crystal light valve is used as the light modulation device. However, the light modulation device is not limited to a liquid crystal light valve, and may be appropriately changed. For example, a configuration in which three reflective type liquid crystal panels are used as the light modulation device may be made. The light modulation device may have a configuration of, for example, a type as follows: a type in which one liquid crystal panel and a color wheel are combined; a type in which three digital mirror devices (DMD) are used; and a type in which one digital mirror device and a color wheel are combined. In a case where only one liquid crystal panel or only one DMD is used as the light modulation device, the member corresponding to the color separation optical system or the color synthesis optical system is not required. A component which can modulate light emitted by a light source may be employed as the light modulation device, in addition to the liquid crystal panel and the DMD.

Modification Example 8

All or some of the position detection unit 106, the image control unit 107, the image processing unit 108, and the calibration control unit 109 may be realized, for example, by hardware using an electronic circuit such as a field programmable gate array (FPGA) or an application specific IC (ASIC), or may be realized by corporation of software and hardware.

The entire disclosure of Japanese Patent Application No. 2017-038128, filed Mar. 1, 2017 is expressly incorporated by reference herein.

What is claimed is:

1. A projector comprising:
    a projection unit that projects a projection image on a projection surface; and
    a control unit that performs calibration of performing position association between the projection image and a captured image, based on the captured image obtained by capturing the projection image,
    wherein the control unit
        detects a position of a first detection point in a first symbol, from a first captured image obtained by capturing a first projection image when the projection unit projects the first projection image including the first symbol onto the projection surface,
        detects a position of a second detection point in a second symbol, based on the position of the first detection point, from a second captured image obtained by capturing a second projection image when the projection unit projects the second projection image including the second symbol onto the projection surface, the second symbol being disposed at a position corresponding to the first symbol and having a shape different from the first symbol,
    wherein the control unit determines a detection area in the second captured image based on the detected position of the first detection point and detects the position of the second detection point in the second symbol included in the detection area, and performs the calibration based on the position of the second detection point.

2. The projector according to claim 1, wherein
a relative position of the first detection point to the first projection image corresponds to a relative position of the second detection point to the second projection image.

3. The projector according to claim 1, wherein
the first symbol is a figure having a corner.

4. The projector according to claim 3, wherein
the first symbol is a figure having a plurality of corners.

5. The projector according to claim 1, wherein
the second symbol is a figure formed by a closed line, and the second detection point is a centroid of the figure formed by the closed line.

6. The projector according to claim 5, wherein
the second symbol is a circle or an ellipse.

7. The projector according to claim 1, wherein
a color of the first symbol is different from a color of the second symbol, and
the projection unit projects the first projection image and the second projection image together onto the projection surface.

8. A control method of a projector which projects a projection image onto a projection surface, and performs calibration of performing position association between the projection image and a captured image, based on the captured image obtained by capturing the projection image, the method comprising:

detecting a position of a first detection point in a first symbol, from a first captured image obtained by capturing a first projection image when the first projection image including a first symbol is projected onto the projection surface;

detecting a position of a second detection point in a second symbol, based on the position of the first detection point, from a second captured image obtained by capturing a second projection image when the second projection image including the second symbol is projected onto the projection surface, the second symbol being disposed at a position corresponding to the first symbol and having a shape different from the first symbol, wherein a detection area is determined in the second captured image based on the detected position of the first detection point and the position of the second detection point is detected in the second symbol included in the detection area; and performing the calibration based on the position of the second detection point.

9. The projector according to claim 1, wherein
the second projection image is projected subsequent to projection of the first projection image.

10. The projector according to claim 1, wherein
the second captured image is obtained subsequent to the first captured image being obtained.

11. The projector according to claim 1, wherein
the position of the second detection point coincides with the position of the first detection point.

12. The projector according to claim 1, wherein
the position of the first detection point is a corner of the first symbol, the position of the second detection point is a centroid of the second symbol, and a position of the corner coincides with a position of the centroid.

13. The control method according to claim 8, wherein
the second projection image is projected subsequent to projection of the first projection image.

14. The control method according to claim 8, wherein
the second captured image is obtained subsequent to the first captured image being obtained.

15. The control method according to claim 8, wherein
the position of the second detection point coincides with the position of the first detection point.

16. The control method according to claim 8, wherein
the position of the first detection point is a corner of the first symbol, the position of the second detection point is a centroid of the second symbol, and a position of the corner coincides with a position of the centroid.

* * * * *